United States Patent
Cheng et al.

(10) Patent No.: US 10,784,990 B2
(45) Date of Patent: Sep. 22, 2020

(54) METHOD AND APPARATUS FOR ENCODING AND MODULATING DATA FOR WIRELESS TRANSMISSION

(71) Applicant: PERASO TECHNOLOGIES INC., Toronto (CA)

(72) Inventors: Gary Cheng, Unionville (CA); Christopher James Hansen, Los Altos, CA (US); Joseph Andonieh, Aurora (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 49 days.

(21) Appl. No.: 15/947,229

(22) Filed: Apr. 6, 2018

(65) Prior Publication Data

US 2018/0294919 A1   Oct. 11, 2018

Related U.S. Application Data

(60) Provisional application No. 62/482,293, filed on Apr. 6, 2017, provisional application No. 62/500,828, filed on May 3, 2017.

(51) Int. Cl.
*H04W 56/00* (2009.01)
*H04L 1/00* (2006.01)
*H04W 72/04* (2009.01)

(52) U.S. Cl.
CPC .......... *H04L 1/0058* (2013.01); *H04L 1/0003* (2013.01); *H04L 1/0011* (2013.01);
(Continued)

(58) Field of Classification Search
CPC ... H04L 1/0058; H04L 1/0003; H04L 1/0011; H04L 1/0057; H04L 1/0083; H04W 72/0466

(Continued)

(56) References Cited

U.S. PATENT DOCUMENTS

2008/0240151 A1* 10/2008 Chitrapu .............. H04B 7/0452
                                                                    370/465
2010/0034092 A1*  2/2010 Krishnamurthy ..... H04W 56/00
                                                                    370/241

(Continued)

FOREIGN PATENT DOCUMENTS

EP        1592160 A1    11/2005

OTHER PUBLICATIONS

Jinmin Kim (LG Electronics): EDMG-Header-A contents ; 11-16-1485-00-00ay-EDMG-Header-A-Contents, IEEE-SA Mentor, Piscataway, NJ USA, vol. 802.11ay Nov. 8, 2016 (Nov. 8, 2016), pp. 1-17. Retrieved from the Internet: URL: https://mentor.ieee.org/802.11/dcn/16/11-16-1485-00-00ay-edmg-header-a-contents.pptx.

(Continued)

*Primary Examiner* — Sai Ming Chan
(74) *Attorney, Agent, or Firm* — Perry + Currier (57) ABSTRACT

A wireless communications assembly and method for encoding and modulating data for transmission is provided. The method includes receiving primary data to be transmitted to a receiving station; selecting a data rate at which to transmit the primary data; selecting a mode associated with the data rate, the mode defining a modulation scheme and a target code rate; generating encoded data, including modifying an error correcting block format having a predefined code rate to generate the encoded data at the target code rate; and extracting at least a portion of the encoded data for modulation of a carrier signal and transmission to a receiving station.

12 Claims, 6 Drawing Sheets

(52) U.S. Cl.
CPC .......... *H04L 1/0057* (2013.01); *H04L 1/0083* (2013.01); *H04W 72/0466* (2013.01)

(58) Field of Classification Search
USPC ........................................................ 370/329
See application file for complete search history.

(56) References Cited

U.S. PATENT DOCUMENTS

2011/0069688 A1    3/2011  Zhang et al.
2016/0142177 A1*  5/2016  Chou .................... H04L 1/0005
                                                                     370/329
2016/0299812 A1* 10/2016  Olbrich ............... G06F 11/1008

OTHER PUBLICATIONS

EPO, Extended European Search Report, dated Aug. 13, 2018, re European Patent Application No. 18166199.2.

* cited by examiner

METHOD AND APPARATUS FOR ENCODING AND MODULATING DATA FOR WIRELESS TRANSMISSION

CROSS-REFERENCE TO RELATED APPLICATIONS

This application claims priority from U.S. provisional application No. 62/482,293, filed Apr. 6, 2017, and U.S. provisional application No. 62/500,828, filed May 3, 2017, the contents of which are incorporated herein by reference.

FIELD

The specification relates generally to wireless communications, and specifically to a method and apparatus for encoding and modulating data for wireless transmission.

BACKGROUND

Certain wireless communications protocols, such as those in the Institute of Electrical and Electronics Engineers (IEEE) 802.11 family of standards, define a variety of features, some of which may be mandatory and others of which may be optional. In particular, the 802.11 standards define various modulation and coding schemes to encode data and modulate a carrier signal to achieve different data rates for transmission. Certain modulation schemes increase spectral efficiency, but may lead to increased transmission error rates.

SUMMARY

An aspect of the specification provides a method in a wireless communications assembly of a transmitting station. The method includes receiving primary data to be transmitted to a receiving station. The method further includes selecting a data rate at which to transmit the primary data. The method further includes selecting a mode associated with the data rate, the mode defining a modulation scheme and a target code rate. The method further includes generating encoded data, including modifying an error correcting block format having a predefined code rate to generate the encoded data at the target code rate. The method further includes extracting at least a portion of the encoded data for modulation of a carrier signal and transmission to the receiving station.

BRIEF DESCRIPTIONS OF THE DRAWINGS

Embodiments are described with reference to the following figures, in which.

DETAILED DESCRIPTION

Figure 1:
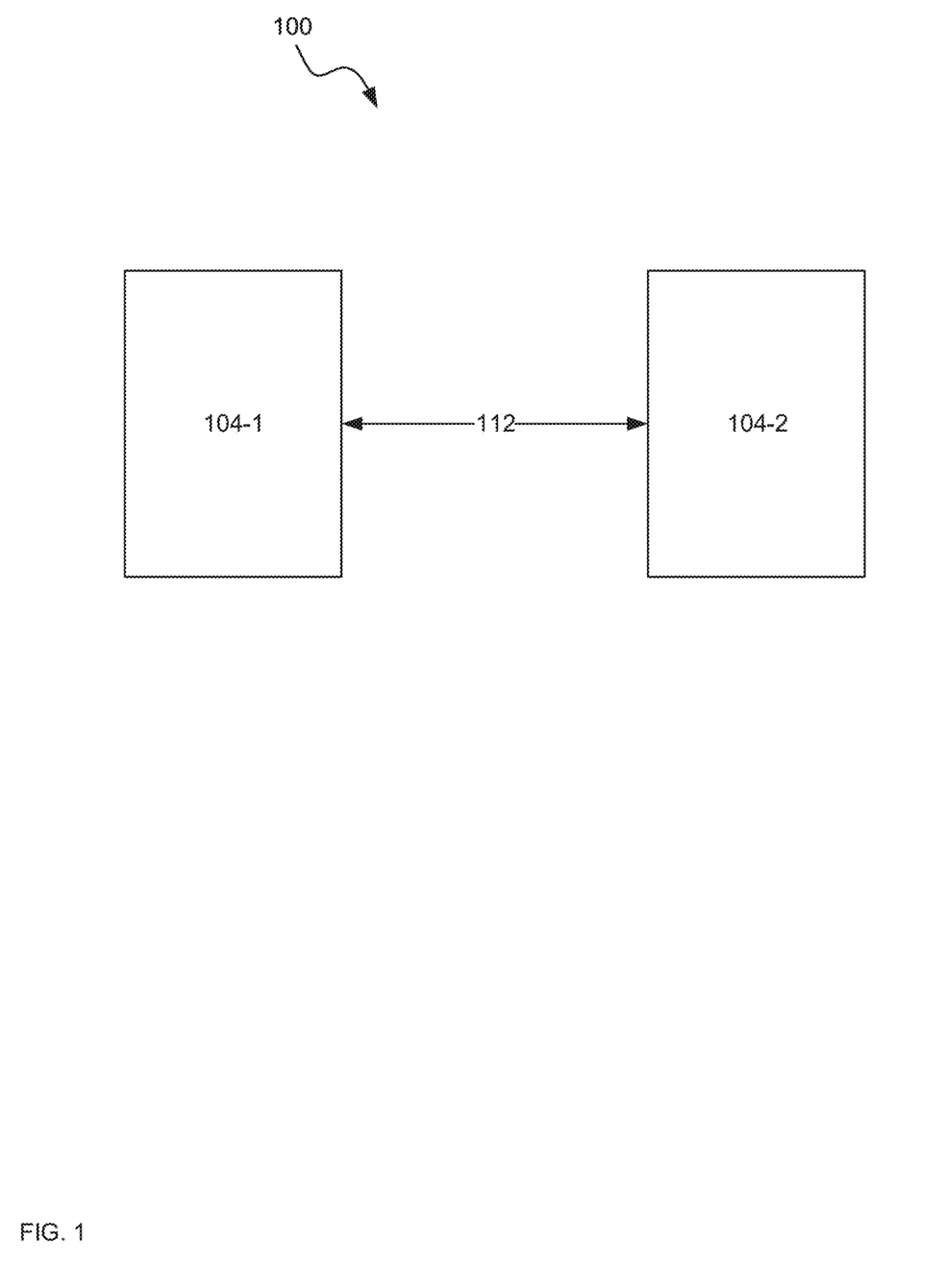
FIG. 1 depicts a wireless communications system.

FIG. 1 depicts a wireless communications system 100, including a plurality of wireless devices 104 (also referred to as stations 104). In particular, FIG. 1 illustrates a transmitting station 104-1 connected with a receiving station 104-2 via a bidirectional wireless link 112. The stations 104-1 and 104-2 are configured to both transmit and receive signals, and are referred to as transmitting and receiving in the context of a single transmission. The transmitting and receiving stations 104-1 and 104-2 may be access points such as a wireless router, a media server, a home computer, a client device configured as a soft access point and the like, or client devices, such as mobile devices such as smartphones, tablet computers and the like. More generally, the stations 104-1 and 104-2 can include any suitable combination of computing devices with wireless communication assemblies suitable for communicating with one another. Thus the wireless connection 112 may be established between the wireless devices 104 illustrated in FIG. 1, as well as any additional wireless devices (not shown) included in the system 100.

In the examples discussed below, the stations 104 of the system 100 each include a wireless communications assembly configured to implement a shared wireless communication standard. In the present example, the stations 104 of the system 100 are each configured to communicate according to a wireless standard selected from the IEEE 802.11 family of standards. More specifically, the stations 104 are each configured to communicate according to the 802.11ay enhancement to the 802.11ad standard, both of which employ carrier frequencies of around 60 GHz (also referred to as mmWave). As will be apparent to those skilled in the art, the discussion below may also be applied to a wide variety of other communication standards.

Figure 2:
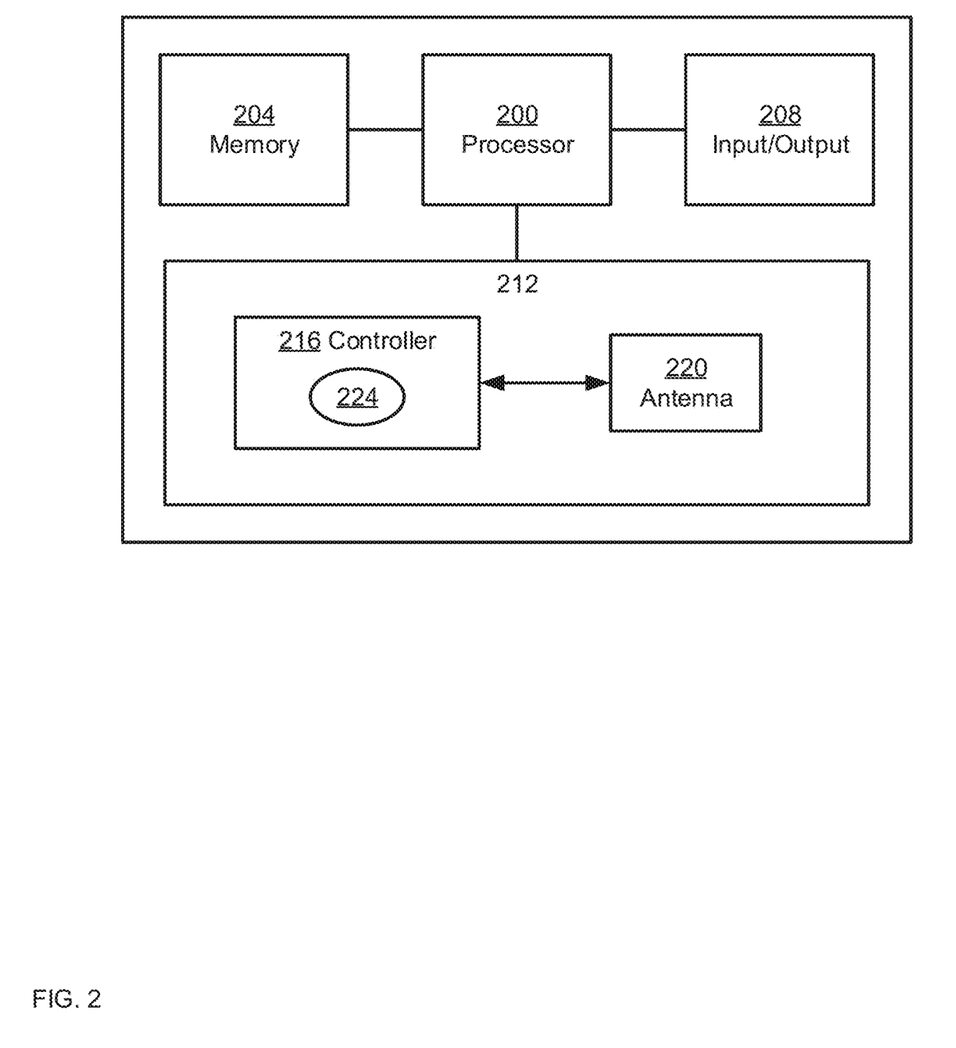
FIG. 2 depicts certain internal components of a wireless device of the system of FIG. 1.

Turning now to FIG. 2, before describing the operation of the stations 104, certain components of a generic station 104 will be described. As will be apparent, the description of the station 104 below also applies to each of the stations 104-1 and 104-2. That is, the stations 104-1 and 104-2 each include the components discussed below, though it will be understood that the particular implementation of each component may vary from device to device.

The station 104 includes a central processing unit (CPU), also referred to as a processor 200. The processor 200 is interconnected with a non-transitory computer readable storage medium, such as a memory 204, having stored thereon various computer readable instructions for performing various actions. The memory 204 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits.

The station 104 also includes one or more input devices and one or more output devices, generally indicated as an input/output device 208. The input and output devices 208 serve to receive commands for controlling the operation of the station 104 and for presenting information, e.g. to a user of the station 104. The input and output devices 208 therefore include any suitable combination of devices, including a keyboard, a mouse, a display, a touchscreen, a speaker, a microphone, cameras, sensors, and the like). In other embodiments, the input and output devices may be connected to the processor 200 via a network, or may simply be omitted.

The station 104 further includes a wireless communications assembly 212 interconnected with the processor 200. The assembly 212 enables the station 104 to communicate with other computing devices. In the present example, as noted earlier, the assembly 212 enables such communication according to the IEEE 802.11ay standard, and thus transmits and receives data at frequencies of around 60 GHz.

The communications assembly includes a controller 216 in the form of one or more integrated circuits, configured to establish and maintain communication links with other devices (e.g., links 112). The controller 216 is also configured to process outgoing data for transmission via one or more antenna arrays, of which an example antenna array 220 is illustrated (e.g. a phased array of antenna elements). The controller 216 is also configured to receive incoming transmissions from the array 220 and process the transmission for communication to the processor 200. The controller 216, in the present example, therefore includes a baseband processor and a transceiver (also referred to as a radio processor), which may be implemented as distinct hardware elements or integrated on a single circuit.

Further, the controller 216 is configured to execute various computer-readable instructions (e.g. stored on a memory element integrated with the controller 216 or implemented as a discrete hardware component of the assembly 212 and connected with the controller 216) in the form of a control application 224 for performing the functions described herein. The control application 224 may be implemented as a software driver executed within the assembly 212. Via the execution of the application 224, the controller 216 is configured to operate the wireless communications assembly to establish connections with the wireless communications assemblies of other devices 104. In particular, the controller 216 is configured to encode and modulate primary data or transmission to the receiving station 104-2.

Figure 3:
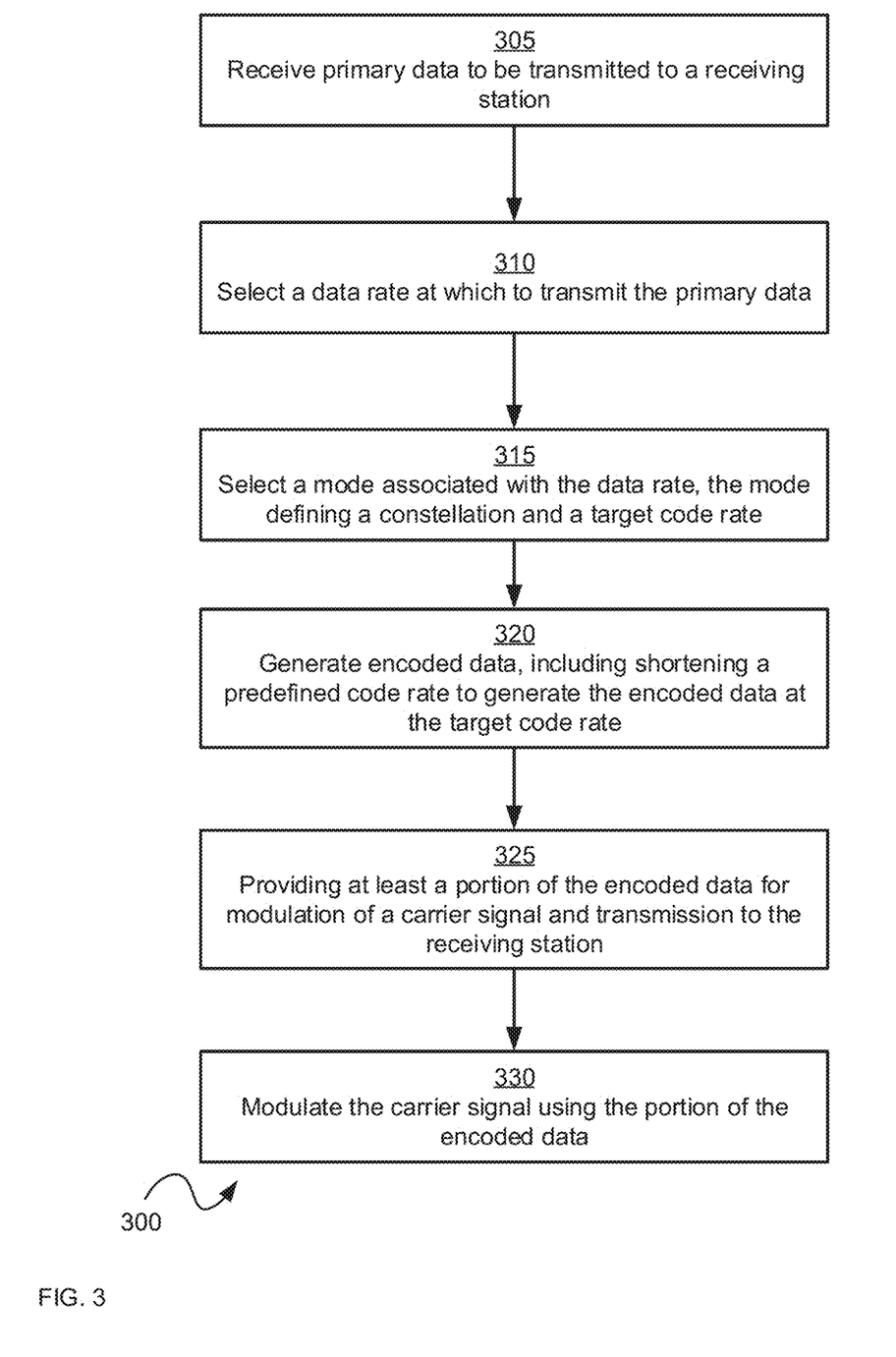
FIG. 3 depicts a method of encoding and modulating primary data for transmission in the system of FIG. 1.

Turning now to FIG. 3, a method 300 of encoding and modulating primary data for transmission is provided. The method 300 will be described in connection with its performance on a station 104, and in particular at a transmitting station 104-1, as illustrated in FIG. 2. The blocks of the method 300 are performed by the controller 216 of the communications interface 212, via the execution of the application 224.

At block 305, the transmitting station 104-1, and in particular the controller 216, receives primary data to be transmitted to the receiving station 104-2. For example, the primary data may be received from the processor 200 via execution of an application, such as a messaging application, a video streaming application or the like, of the transmitting station 104-1.

At block 310, the controller 216 selects a data rate at which to transmit the primary data. For example, the controller 216 may select a data rate based on at least one of: the size of the primary data, capabilities of the transmitting station, capabilities of the receiving station, and other characteristics of the primary data.

At block 315, the controller 216 selects a mode associated with the data rate, the mode defining a modulation scheme and a target code rate. The target code rate defines a ratio of information bits to total number of bits at which the primary data is to be encoded. Specifically, the total number of bits may include a number of parity bits generated during encoding for error correction during transmission. The mode also provides a modulation scheme for modulation of the carrier signal based on the encoded data. For example, the controller 216 may be configured to select a given mode based on at least one of: selected data rate, encoding and modulation capabilities of the transmitting station 104-1, and decoding and demodulation capabilities of the receiving station 104-2.

In some implementations, a shared wireless standard, such as the 802.11ay standard, may define modulation and coding schemes (MCS) modes that can be selected for encoding and modulating the primary data. For example, each mode may define a particular combination of MCS index, modulation scheme, target code rate, data rate, and other properties for modulation. Several example MCS modes are provided in Table 1.

TABLE 1

MCS Modes

| MCS Mode | 8-PSK Applied | MCS Index | Modulation Scheme | Number of Coded Bits per Symbol | Repetition | Code Rate | Normal GI Data Rate (Mbps) |
|---|---|---|---|---|---|---|---|
| 12 | 0 | 12 | π/2-16-QAM | 4 | 1 | 1/2 | 3080 |
| 12a | 1 | 12 | π/2-8-PSK | 3 | 1 | 2/3 | 3080 |
| 13 | 0 | 13 | π/2-16-QAM | 4 | 1 | 5/8 | 3850 |
| 13a | 1 | 13 | π/2-8-PSK | 3 | 1 | 5/6 | 3850 |

The MCS modes may be stored in a discrete hardware component of the assembly 212 and connected with the controller 216, or stored in a memory element integrated with the controller 216.

The modulation schemes may be represented by constellation diagrams. The constellation diagrams include constellation points which represent possible symbols that the modulation scheme may select to represent the data for modulation. The constellation diagrams representing the π/2-16-QAM and the π/2-8-PSK modulation schemes are shown respectively in FIGS. 4A and 4B.

Figure 4A:
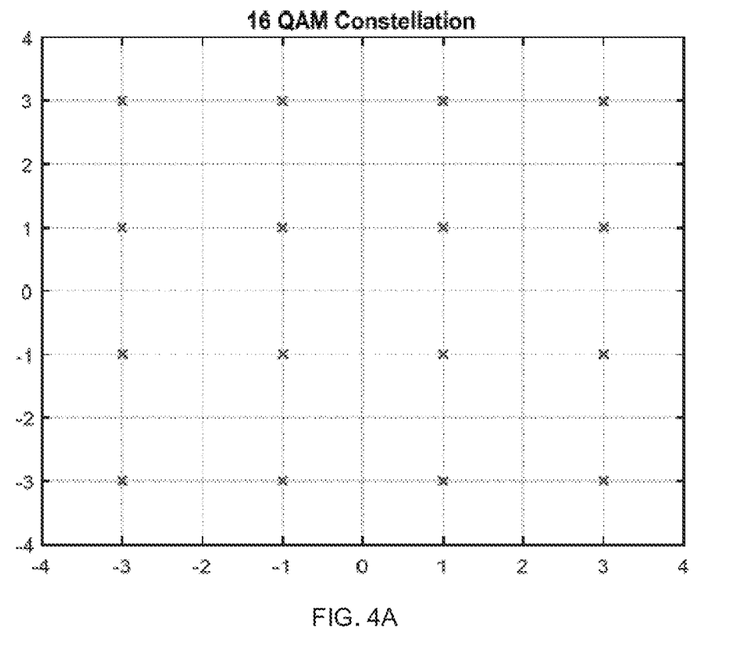
FIGS. 4A and 4B depict example constellation diagrams.
Figure 4B:
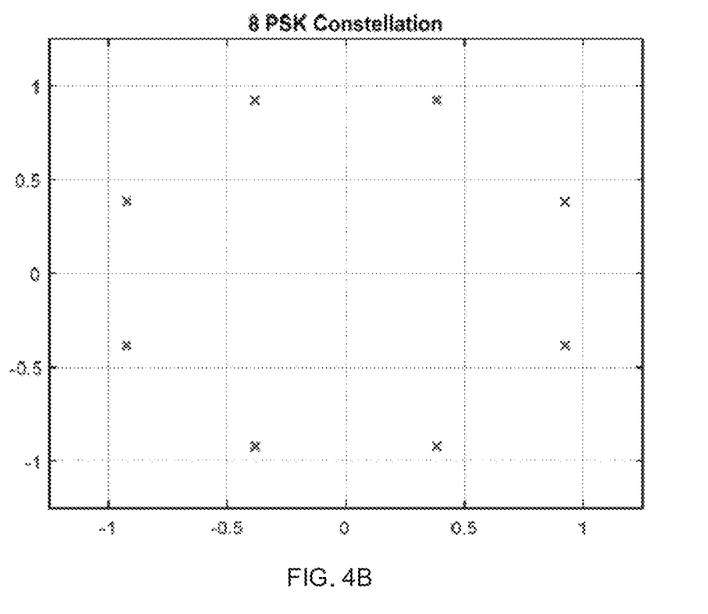

Further, the geometry of the constellation points is representative of certain aspects of the modulation scheme. In particular, the power required to transmit a certain symbol is represented by the distance of the corresponding constellation point to an origin of the constellation diagram. The peak power of the modulation scheme is defined as the power of the symbol having its corresponding constellation point at the greatest distance from the origin. The average power is defined as the average power of all the symbols.

In some implementations, such as the π/2-8-PSK modulation scheme shown in FIG. 4B, the modulation scheme is represented by a circular constellation diagram having constellation points equidistant from the origin. In particular, circular constellation diagrams have a peak power equal to the average power, hence the PAPR is minimized. In contrast, the π/2-16-QAM modulation scheme shown in FIG. 4A is represented by a relatively denser constellation diagram, which allows for higher spectral efficiency, however the PAPR is higher than that of the π/2-8-PSK modulation scheme. To accommodate the higher PAPR, a lower code rate may be used to allow for more parity data for error correction.

In particular, for 60 GHz implementations, front end components may be peak power limited. Hence, at lower peak-to-average power ratios (PAPR), power amplifiers can transmit more average power, low noise amplifiers and mixers may be less sensitive to interference, and lower dynamic ranges and fewer bits of resolution can be implemented for analog-to-digital converters and digital-to-analog converters. More generally, at a higher average output power relative to a non-circular constellation, modulation using circular constellations may be more tolerant of amplifier distortion. Hence, when the mode defines a modulation scheme having a circular constellation diagram, the antenna array 220 may subsequently be controlled to transmit the modulated carrier signal at a power level substantially matching the peak power of the circular constellation diagram.

Returning to FIG. 3, at block 320, the controller 216 generates encoded data. Specifically, the controller 216 modifies an error correcting block format having a predefined code rate to generate the encoded data at the target code rate. For example, the encoder may be configured to shorten the block format, as described herein, puncture the block format by removing parity bits to increase the predefined code rate to the target code rate, or otherwise modify the block format to generate the encoded data at the target code rate.

Figure 5:
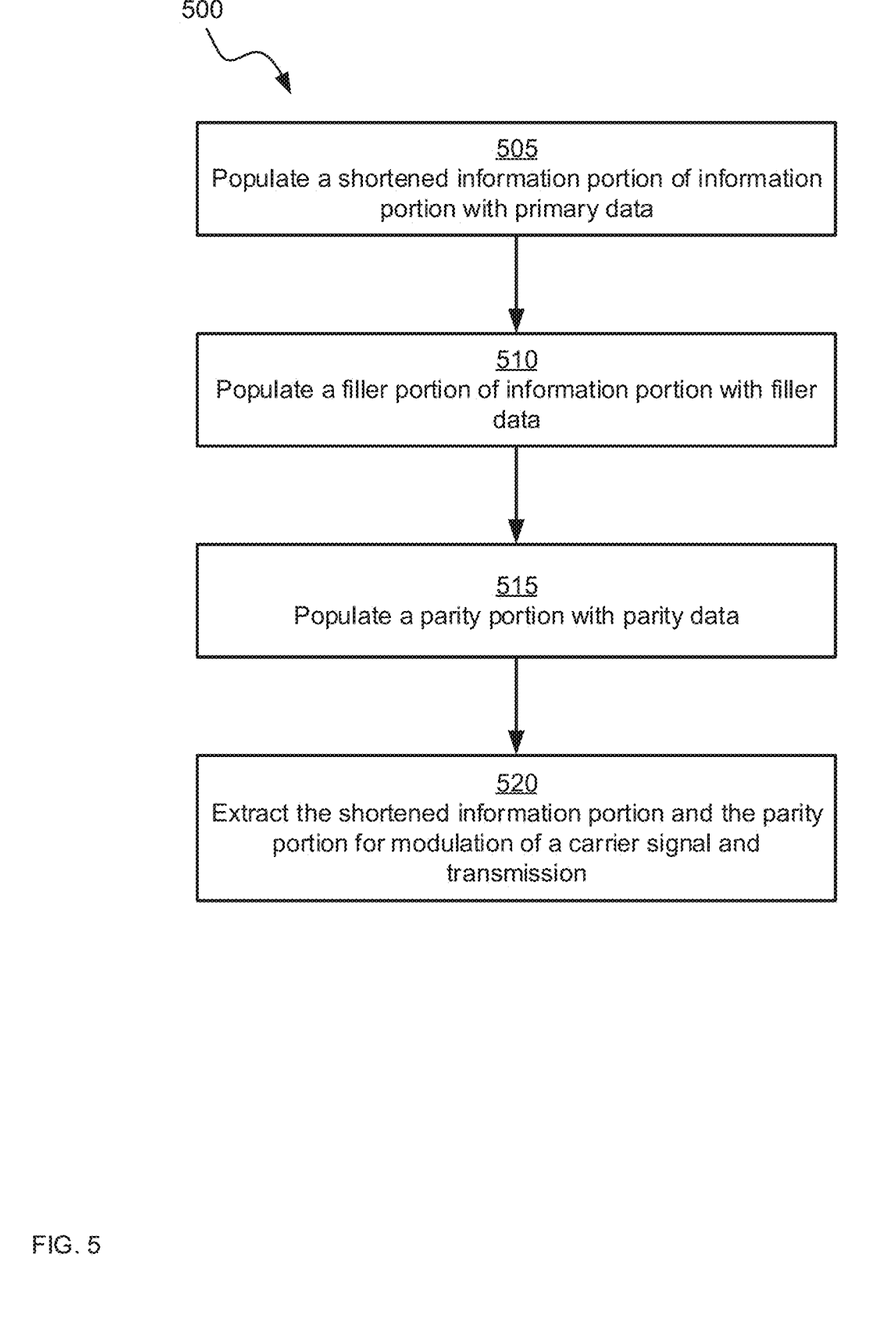
FIG. 5 depicts a method of generating encoded data in the system of FIG. 1.

Turning now to FIG. 5, a method 500 of generating encoded data by shortening the error correcting block format is provided.

Generally, the error correcting block format includes an information portion having a predefined information portion length and a parity portion having a predefined parity portion length. Together, the information portion length and the parity portion length form the block length. In particular, the information portion length and the parity portion length are defined such that the ratio of the information portion length to the block length is the predefined code rate of the block format. The controller 216 is configured to populate the information portion with at least a portion of the primary data in accordance with the predefined information portion length of the block format. The controller 216 is further configured to generate parity data for populating the parity portion. Thus, the controller 216 encodes the primary data according to the predefined code rate of the block format.

More particularly, at block 505, the controller 216 populates a shortened information portion of the information portion with at least a portion of the primary data. A portion of the primary data may be extracted for populating the shortened information portion in accordance with length requirements of the shortened information portion, as will be described further herein. Specifically, the shortened information portion represents the portion of the primary data to be encoded for transmission, and is shorter in length than the information portion length defined by the block format as described above.

At block 510, the controller 216 populates a filler portion of the information portion with filler data. For example, the controller 216 may populate the filler portion with zeroes or ones as filler data. The filler portion pads the shortened information portion to form the information portion. Specifically, the filler portion length and the shortened information portion length sum to the information portion length as defined by the block format.

At block 515, the controller 216 populates the parity portion of the block format. Per general operating procedures, the controller 216 encodes the information portion by generating parity bits or parity data to allow for forward error correction during transmission. Specifically, for the given block format, the controller 216 requires the information portion to have an information portion length as defined by the block format. Since the shortened information portion padded with the filler portion have lengths summing to the information portion length defined by the block format, the controller 216 generates parity data for populating the parity portion using software and/or hardware preconfigured to process the block format. Specifically, the software and/or hardware used in current systems may be used without further modification to accommodate the length of the shortened block format. Hence, the controller 216 generates encoded data based on the information portion containing the primary data in the shortened information portion, and the filler data in the filler portion. The controller 216 may employ error correcting codes such as low-density parity-check (LDPC) codes, Reed-Solomon codes, Golay codes or the like.

As described above, the information portion and the parity portion form the error correcting block format. The predefined code rate of the block format is defined by the ratio of the information portion length to the block length. Similarly, the shortened information portion and the parity portion form a shortened error correcting block format. The code rate of the shortened block format is defined by the ratio of the shortened information portion length to the shortened block length. In particular, the shortened information portion and the filler portion are selected such that the code rate of the shortened block format matches the target code rate.

At block 520, the encoder 224 provides the shortened information portion and the parity portion for modulation of the carrier signal and transmission to the receiving station. In particular, the encoder 224 discards the filler portion of the information portion and only provides the shortened block format for further processing. Thus, the encoder 224 provides the encoded data at the target code rate.

Generally, shortening the block format includes stuffing or padding the filler portion of the information portion with filler data. The filler portion allows the encoder 224 to generate the parity data and encode the information portion according to existing coding schemes. The filler portion is subsequently discarded so that the ratio of the shortened information portion to the shortened block length matches the target code rate.

In some implementations, the predefined code rates may be defined in standards such as the 802.11ay standard, or the 802.11n standard. In other implementations, code re-use and shortening may apply to code rates having longer block lengths. For example, where the block length is doubled, the number of information bits and the number of stuffed filler data (i.e. zeros or ones) may also be doubled.

In some implementations, when a predefined code rate cannot be shortened to exactly match the target code rate, the predefined code rate may be shortened to a code rate which is close to the target code rate. In such implementations, the encoder 224 may be configured to fill the filler portion with filler data to pad the information portion to an appropriate information portion length.

Figure 6:
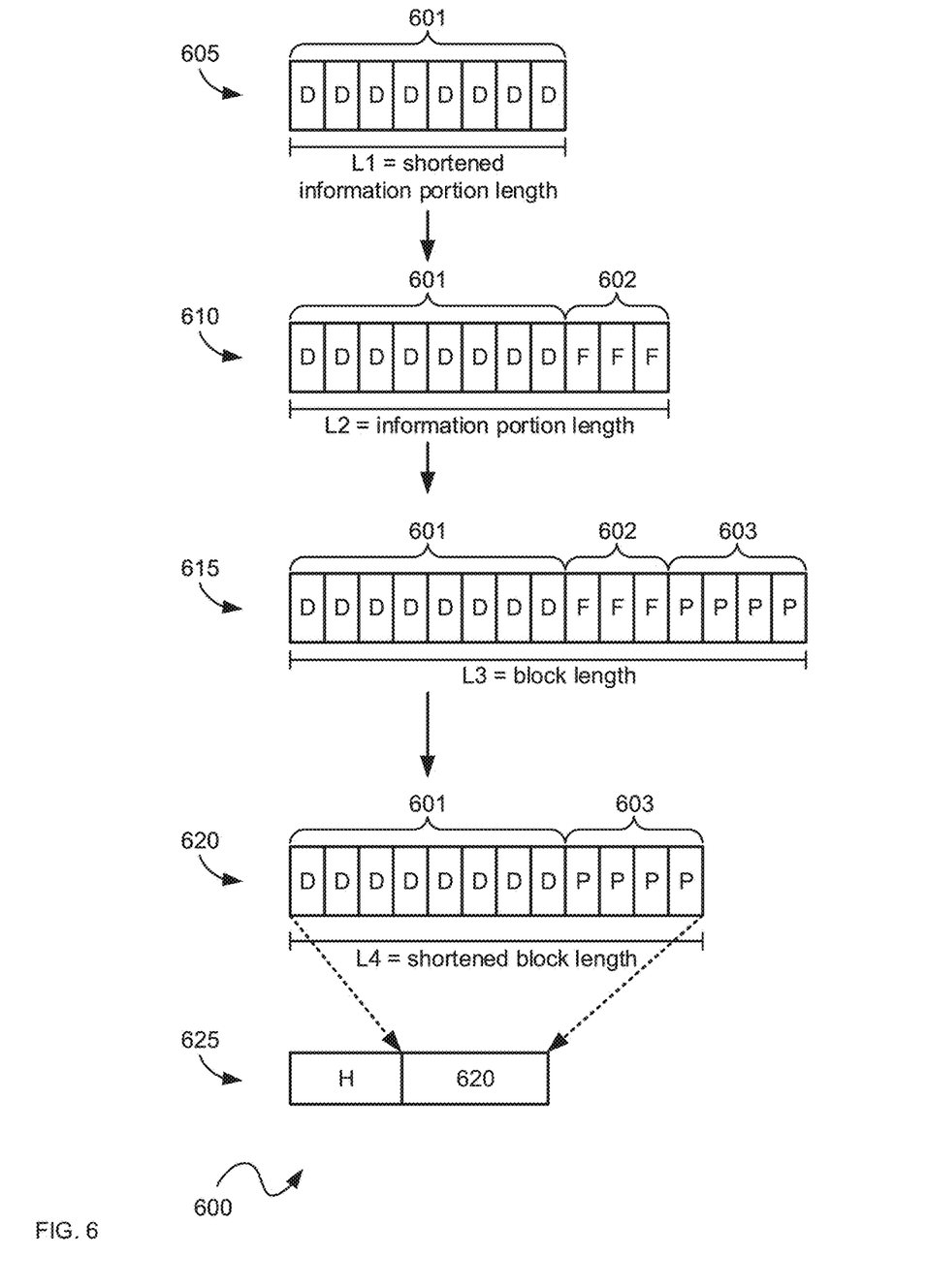
FIG. 6 depicts a sequence of data bits in the system of FIG. 1.

FIG. 6 depicts a sequence 600 of data bits as they are modified during the method 500. Note that the data bits represented are exemplary; the lengths of the sequences and ratios between portions are not shown as they generally would appear in a practical implementation.

Bits 605 include primary data bits D extracted from the primary data. Specifically, at block 505, the controller 216 populates primary data bits D in the shortened information portion 601 which has length L1.

Bits 610 include the primary data bits D and filler bits F. Specifically, at block 510, the controller 216 generates the filler bits F to populate the filler portion 602. The filler bits F pad the primary data bits D in the shortened information portion 601 fill the information portion. The information portion has length L2.

Bits 615 include the primary data bits D, the filler bits F, and parity bits P. At block 515, the controller 216 generates parity bits P based on the primary data bits D and the filler bits F to populate the parity bits P in the parity portion 603. Specifically, the controller 216 encodes the primary data bits D and the filler bits F according to conventional methods requiring L2 number of bits for encoding. The primary data bits D, the filler bits F, and the parity bits P are populated in the block format having length L3.

Bits 620 include the primary data bits D and the parity bits P. At block 520, the controller extracts the primary data bits D and the parity bits P as the encoded data for modulation. Specifically, the primary data bits D in the shortened information portion 601 and the parity bits P in the parity portion 603 are extracted to form the shortened block format having length L4.

The predefined code rate of the block format is defined by the ratio L2/L3. The block format may be shortened into a shortened block format in accordance with method 500. In particular, the information portion is shortened from L2 to L1 by discarding filler bits F in the filler portion 602. Accordingly, the block format is also shortened from L3 to L4. Hence, the code rate of the shortened block format is defined by the ratio L1/L4. L1 is specifically chosen so that the ratio L1/L4 matches the target code rate.

Frame 625 includes a header H and the bits 620. In some implementations, the header H includes a mode indicator indicating the mode selected at block 315. The mode indicator allows the receiving station 104-2 to demodulate the carrier signal and decode the encoded data according to the appropriate modulation and coding scheme. In particular, the receiving station 104-2 receives shortened encoded data and populates the shortened information portion and the parity portion per the received signal. To accommodate the shortened encoded data, the receiving station 104-2 populates the filler portion with the filler data, simulating perfectly received filler data. The receiving station 104-2 thus has a fully populated block format which may be decoded according to existing decoding schemes.

For example, in the 802.11ay standard, the mode indicator may be incorporated into header bits in the legacy header, the EDMG Header A or the EDMG Header B.

In other implementations, the transmitting station 104-1 and the receiving station 104-2 may communicate capabilities and the selected mode through the mode indicator and/or through capabilities fields, such as an organizational unique identifier (OUI), through a special information element defined by an entity such as the Wi-Fi Alliance, through a special information field defined by a manufacturer or the like.

Returning to FIG. 3, at block 325, the controller 216 extracts a portion of the encoded data for modulation of a carrier signal and transmission to the receiving station. In particular, the extracted portion of the encoded data has the target code rate.

At block 330, the controller 216 modulates the carrier signal using the extracted a portion of the encoded data according to the mode selected at block 315.

For specific examples, reference is made to the MCS modes defined in Table 1.

In particular, the MCS mode 12 is defined to be modulated using the $\pi/2$-16-QAM scheme at a code rate of 1/2, which results in a Normal GI data rate of 3080 Mbps. In accordance with the present disclosure, an alternate MCS mode 12a is defined to be modulated using the $\pi/2$-8-PSK scheme at a code rate of 2/3, which results in an equivalent Normal GI rate of 3080 Mbps.

In particular, the MCS mode 12a provides a smaller constellation diagram, but is transmitted at a higher code rate. The code rate of 2/3 is generated by shortening the existing 3/4 LDPC code as defined in the 802.11ad standard. Specifically, the 3/4 code rate having block length 672 bits (i.e. 504 information bits and 168 parity bits) is shortened by padding the filler portion with 168 zero bits to fill the information portion. After the filler portion is discarded, 336 information bits and 168 parity bits remain, resulting in the target code rate of 2/3. The circular nature of the 8-PSK constellation diagram results in a lower PAPR, allowing the carrier signal to be transmitted at a higher average power, and resulting in a net gain. In particular, as compared to the 16-QAM modulation scheme, the 8-PSK modulation scheme requires about 0.4 dB more in signal-to-noise ratio (SNR), but can be operated at about 3.25 dB higher average power.

In another example, the MCS mode 13 is defined to be modulated using the $\pi/2$-16-QAM scheme at a code rate of 5/8, which results in a Normal GI data rate of 3850 Mbps. In accordance with the present disclosure, an alternate MCS mode 13a is defined to be modulated according to the $\pi/2$-8-PSK scheme at a code rate of 5/6, which results in an equivalent Normal GI data rate of 3850 Mbps.

In particular, the MCS mode 13a provides a smaller constellation diagram, but is transmitted at a higher code rate. The code rate of 5/6 is generated by shortening the existing 7/8 LDPC code as defined in the 802.11ad standard. For example, the 7/8 code rate having block length 672 bits (i.e. 588 information bits and 84 parity bits) is shortened by padding the filler portion with 168 zero bits to fill the information portion. After the filler portion is discarded, 420 information bits and 84 parity bits remain, resulting in the target code rate of 5/6. The circular nature of the 8-PSK constellation diagram results in a lower PAPR, allowing the carrier signal to be transmitted at a higher average power, and resulting in a net gain. In particular, as compared to the 16-QAM modulation scheme, the 8-PSK modulation scheme requires about 0.6 dB more in SNR, but can be operated at about 4.15 dB higher average power.

Thus, the MCS modes 12a and 13a may permit the same transmission bandwidth while requiring lower peak power, which may reduce bit error rate, particularly in 60 GHz devices, and other devices which have peak power limits in the transmitting station 104-1 and/or the receiving station 104-2.

Other MCS modes, such as those from Legacy DMG or IEEE 802.11ad, may also be extended to define further alternate modes. Other constellations, such as 16APSK as an alternative to 16QAM, 32APSK as an alternative to 16QAM or 64QAM are also contemplated.

In some implementations, the mode may define a modulation scheme and code rate which do not employ an integer number of information bits per transmitted symbol (constellation point). For example, the mode may be defined to use the 8-PSK modulation scheme with a code rate of 5/8. In particular, the combination of 8PSK with a code rate of 5/8 would result in a data rate providing a mode in between MCS modes 11 and 12.

Thus, the present disclosure provides a system and method for encoding and modulating data for transmission. In particular, alternate modes provide smaller constellations transmitted at a higher code rate, as compared to existing modes. The alternate modes result in an equivalent data rate, and can be transmitted at a higher average power, resulting in an overall increase in range and/or efficiency. The alternate modes can also result in a reduction in implementation cost and complexity. Further, a method of shortening existing code rates is provided to allow existing encoders, such as LDPC encoders, to employ existing algorithms to generate encoded data at new target code rates.

The scope of the claims should not be limited by the embodiments set forth in the above examples, but should be given the broadest interpretation consistent with the description as a whole.

The invention claimed is:

1. A method in a wireless communications assembly of a transmitting station, the method comprising:
receiving primary data to be transmitted to a receiving station;
selecting a data rate at which to transmit the primary data;
selecting a mode associated with the data rate, the mode defining a modulation scheme and a target code rate;
selecting a predefined error correcting block format having a predefined code rate different from the target code rate, the error correcting block format further having an information portion and a parity portion;
generating encoded data by modifying the predefined error correcting block format having the predefined code rate to encode the primary data at the target code rate, wherein modifying the predefined error correcting block format comprises:
populating a shortened information portion of the information portion with at least a portion of the primary data;
populating a filler portion of the information portion with filler data; and
populating the parity portion of the error correcting block format with parity data, the shortened information portion and the parity portion defining a shortened error correcting block format;
wherein a ratio of an information portion length to a block length matches the predefined code rate, and wherein a ratio of a shortened information portion length to a shortened block length matches the target code rate; and
extracting at least a portion of the encoded data for modulation of a carrier signal and transmission to the receiving station.

2. The method of claim 1, wherein extracting at least a portion of the encoded data comprises extracting the shortened information portion and the parity portion of the encoded data for modulation of the carrier signal and transmission to the receiving station.

3. The method of claim 1, further comprising providing a mode indicator in a header of a frame containing the encoded data, the mode indicator indicating the selected mode.

4. The method of claim 1, further comprising modulating the carrier signal using the portion of the encoded data, according to the modulation scheme.

5. The method of claim 1, wherein the modulation scheme is represented by a circular constellation diagram having constellation points equidistant from an origin of the constellation diagram.

6. The method of claim 5, further comprising:
modulating the carrier signal using the portion of the encoded data according to the modulation scheme; and
transmitting the modulated carrier signal at a power level substantially matching a peak power of the modulation scheme.

7. A wireless communications assembly of a transmitting station, the wireless communications assembly comprising:
an antenna array; and
a controller interconnected with the antenna array, the controller configured to:
receive primary data to be transmitted to a receiving station;
select a data rate at which to transmit the primary data;
select a mode associated with the data rate, the mode defining a modulation scheme and a target code rate;
select a predefined error correcting block format having a predefined code rate different from the target code rate, the error correcting block format further having an information portion and a parity portion;
in order to generate encoded data, modify the predefined error correcting block format having the predefined code rate to encode the primary data at the target code rate, wherein to modify the predefined error correcting block format, the controller is to:
populate a shortened information portion of the information portion with at least a portion of the primary data;
populate a filler portion of the information portion with filler data; and
populate the parity portion of the error correcting block format with parity data, the shortened information portion and the parity portion defining a shortened error correcting block format; and
wherein a ratio of an information portion length to a block length matches the predefined code rate, and wherein a ratio of a shortened information portion length to a shortened block length matches the target code rate; and
extract at least a portion of the encoded data for modulation of a carrier signal and transmission to the receiving station.

8. The wireless communications assembly of claim 7, wherein the controller is configured to extract the shortened information portion and the parity portion of the encoded data for modulation of the carrier signal and transmission to the receiving station.

9. The wireless communications assembly of claim 7, wherein the controller is configured to provide a mode indicator in a header of a frame containing the encoded data, the mode indicator indicating the selected mode.

10. The wireless communications assembly of claim 7, wherein the controller is further configured to modulate of the carrier signal according to the modulation scheme.

11. The wireless communications assembly of claim 7, wherein the modulation scheme is represented by a circular constellation diagram having constellation points equidistant from an origin of the constellation diagram.

12. The wireless communications assembly of claim 11, wherein the controller is further configured to:
modulate the carrier signal according to the modulation scheme; and control the antenna array to transmit the modulated carrier signal at a power level substantially matching a peak power of the modulation scheme.

\* \* \* \* \*